April 17, 1934.  C. G. ARNOLD  1,954,792
SUSPENDERS
Filed Dec. 23, 1929
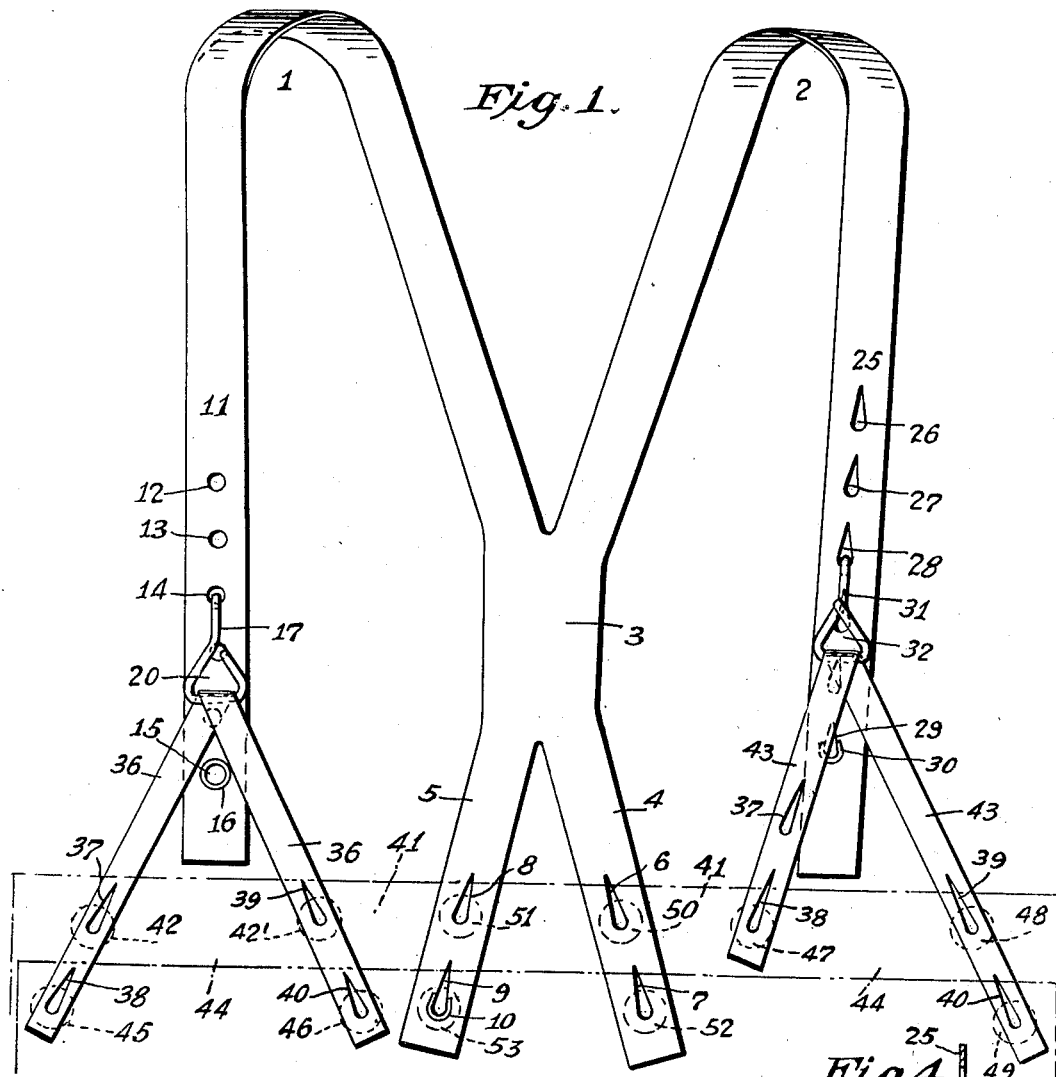
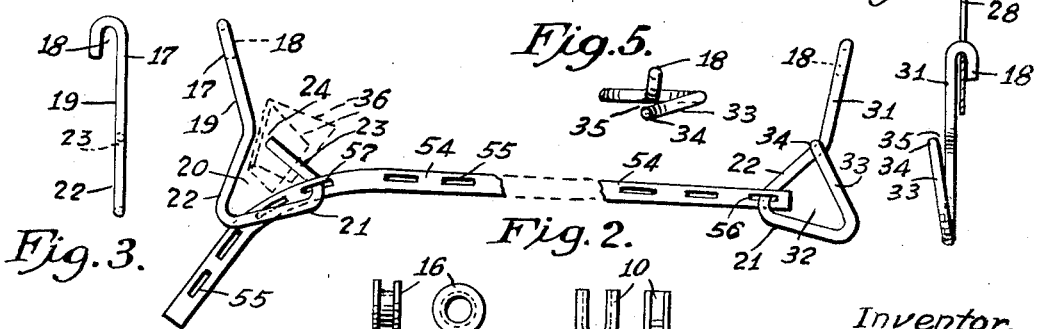
Inventor,
Carl G. Arnold Patented Apr. 17, 1934

1,954,792

UNITED STATES PATENT OFFICE 1,954,792

SUSPENDERS

Carl G. Arnold, Los Angeles, Calif.

Application December 23, 1929, Serial No. 415,978

4 Claims. (Cl. 241—26)

The invention relates to improvements in garment supporting suspenders adapted to support a plurality of garments and having shoulder straps, suspender ends, and step adjusting devices on the straps. The objects of the improvement are to present novel structures of such parts, as hereinafter described and claimed and illustrated on the accompanying drawing.

Here Fig. 1 is a view of the suspenders, and showing modifications. Fig. 2 is a detail view of the adjustable hook loops in Fig. 1; and showing a modification to Fig. 1 in applying an adjusting strip between the two hook loops. Fig. 3 is a side view of one hook loop. Fig. 4 and Fig. 5 are side and top views of the other modified hook loop; Fig. 4, moreover, shows a piece of the modified shoulder strap, in section, engaged by the recess of the hook of the hook loop. Fig. 6 shows a reenforcing eyelet for holes engaged by a hook loop. Fig. 7 shows an open U shaped eyelet for similarly reenforcing the button holes and the adjusting slots on a shoulder strap.

The shoulder straps 1, 2 are, in the form shown at 3, united integrally, that is, made of a single piece of suitable material as, for instance, leather, or webbing, and have shorter ends 4, 5 with garment supporting button holes 6, 7 and 8, 9. These holes for better wear, may at their bases be reenforced, as indicated at 10, by U shaped metallic eyelets of Fig. 7; the manner in which the holes 6, 7, 8, 9 engage buttons on garments will be set forth hereinafter.

The longer end 11 of strap 1 has a single series of step adjusting holes or openings 12, 13, 14 to 15 which, as marked at 16, may be reenforced by metallic eyelets of Fig. 6. These holes, of proper size, which serve to adjust the suspender end 36, described later on, are stepwise engaged by a hook loop 17, having a hook 18. This hook loop in the form or shape as illustrated in Figs. 1, 2 and 3, is made of one piece of metallic wire, preferably. The hook 18, engaging by step adjustment the holes or openings 12 to 15, freely swings therein, the purpose of which will be disclosed later on. The hook loop 17, Figs. 2 and 3, consists of an open hook 18 at one end of a stem 19, and at the other end of stem 19, of an open loop 20, at right angle to hook 18, that is, the plane in which the hook is located, is, as Fig. 3 indicates, at right angle to the plane of the loop. Loop 20 has a base 21, at one of its ends connected to stem 19 by a branch 22, and at the other end has a free branch 23 directed towards 19 or 22, but stopping short thereof; thereby a narrow opening or passage 24 for the edge of the suspender end is left, as will be described.

The longer end 25 of strap 2, as a modification, has a single series of button hole like slots 26, 27, 28 to 29; these may at their bases, as indicated at 30, be reenforced similarly to 9, by eyelets 10 of Fig. 7.

Again, in the adjusting openings 26 to 29, a modified hook loop 31 swings freely by the open hook 18 easily inserted in the slots and properly held therein, Fig. 4. In Figs. 2, 4 and 5, the hook loop 31 consists of an open hook 18 at one end of stem 19, and at the other end of 19, at substantially right angle to hook 18, as before set forth for hook loop 17, of an open loop 32. This loop has a base 21 connected at one of its ends to stem 19 by a branch 22, and at the other end has a free branch 33 directed towards 19 or 22, but its free end 34 extending sideways of the plane formed by 19 and 21 and overlapping 19 or 22 in such a manner as to leave a narrow opening or passage 35, similarly functioning as passage 24, for the edgewise insertion of suspender end 43.

In the loop 20, Figs. 2 and 3, the free branch 23 extends, in the plane formed by 21 and 22, quite directly towards 19 or 22. In the loop 32 the free branch 33, after passing the rounded bend between 21 and 33, Figs. 2 and 4, by slightly deviating from the plane 21, 22, extends not quite so directly, Fig. 5, towards 19 or 22, as 23 does; but this is only a matter of degree, not kind. In the general, broad sense of the word towards, both branches 23 and 33 are comprehended in the one common broad term, directed, or extending, towards 19 or 22.

The suspender end 36 is shown as a one piece flat strap of, for instance, leather, or webbing, adapted to move slidingly on base 21, and is provided at each and with two button holes 37, 38 and 39, 40 which support the two garments 41 and 44, as described next.

The broken line 41 represents the upper edge of a garment, like pants, having the buttons 42, 42', dotted, located on the inside of the pants. The undergarment 44, in broken line, like drawers, has the buttons 45, 46.

The button holes 37 and 39 engage the buttons 42 and 42' on one garment 41 and button holes 38 and 40 engage buttons 45 and 46 of the other garment 44.

The suspender end 43 is same in makeup as 36 and slides on base 21 of loop 32, but it is in a modified manner applied to garments 41 and 44. The button holes 38 and 39 engage buttons 47, 48 of pants 41, button hole 40 engages the only one button 49 on drawers 44, while button hole 37 is not used in this application.

The suspender end 43 by its sliding motion on base 21 is more worn thereon, at a certain place, in its regular, continual use. To extend the life of 43, the holes 37 and 40 would be placed on buttons 47 and 48; button 49 by pulling the garment 44 a little over sideways would be made to engage button hole 38, while hole 39 would remain free. Thereby the wearing place on 21 would be shifted and, as an advantageous result the wearing out of the sliding part or place of the suspender end 43 is reduced, and a suspender end 43 can serve longer. The same result will be obtained by the variable garment supporting button holes, when strap 43 in Fig. 1 is taken off the buttons, reversed entirely, and holes 37, 38, 40 put on buttons 48, 49, 47; then reversed strap 43 will again appear in same location as in Fig. 1.

As the button holes in suspender end, as just described, can be variedly applied to the garment buttons, they are designated as variable button holes.

The pants 41 have, on the rear, inside buttons 50, 51 and drawers 44 have buttons 52, 53 which engage the garment supporting button holes 6, 8 and 7, 9.

As a modified form of the suspenders in Fig. 1 the hook loops 17 and 31 are in Fig. 2 adjusted by a connecting strip 54 having a row of slits or openings 55; one of these slits, the end slit 56, is slipped onto end 34 and then slides along 33 and 21 up to 22, where it is held not to be detached usually. Any other slit, as 57, is similarly slipped onto 23. By thus selecting suitable adjusting slits the distance between hook loops 17 and 31, in Fig. 1, may be properly fixed to hold the strap parts 11 and 25 in a safer position from falling off the shoulders. In consideration of this, in Fig. 2 the loops 20 and 32 are shown inclined toward each other.

The suspenders may be operated in the following manner. The button holes of the ends 4, 5 and of the suspender ends 36 and 43 are buttoned to the garments to choice. Then the hook loops 17 and 31, through their loop openings 24 and 35, are slipped on the suspender ends, and each adjustingly hooked into one of the openings of straps 11 and 25. In case an adjusting strip 54 is still additionally desired, this is applied as set forth before.

For detaching the suspenders strip 54, if such is used, is slipped out of only loop 20, remaining hanging in loop 32; then the hook loops 17 and 31 are not unhooked, but only the suspender ends 36, 43 are manipulated to slide out of loops 20 and 32 edgewise through the passages 24 and 35, as sketched for slotted suspender end 36 in Fig. 2. It is noted here that the suspender ends 36, 43, when in use, will not slip out by themselves from loops 20, 32, but only when manipulated edgewise; the structure of passage 35 gives particularly greater safety therefor. But even the removal of ends 36 and 43 is not necessary; the straps 1 and 2 may simply be thrown off the shoulders sideways and also to be put back. This is especially well feasible because the suspender ends move slidingly in the loops, and the hook loops swing freely any way. This, moreover, gives great flexibility to the suspenders, yielding easily to every motion of the body of the wearer, even when unelastic shoulder straps are used, which are less expensive and more durable than elastic straps.

It will be understood that straps 1, 2 may be made symmetrical, using same step adjusting openings and same kind of hook loops. Also loops 20 and 32 may be hooked onto the straps inside the straps, that is between the strap and the body of the wearer, or outside.

The advantages of the improved suspenders are, that they consist of few simple parts; they may longer be used, by only exchanging the more wearing out suspender ends, though even these serve longer, these ends also hold two garments conveniently. The suspenders may be quickly removed and put back in use and have great flexibility.

I claim the combinations:

1. In suspenders, a shoulder strap with a single series of step adjusting openings, a therein freely swinging hook loop; this hook loop consisting of a stem having at one end an open hook, and at its other end at right angle to the hook of an open loop, this loop having, a base with a branch connecting base and stem, and a free branch extending towards the other branch, the free end of the free branch passing the other branch sideways leaving the opening for the loop.

2. In suspenders two shoulder straps; each having a button hole at one end, a single series of step adjusting button hole like slots in the strap, therein a freely swinging hook loop with an open loop; a hereon sliding single piece suspender end with button holes; an adjusting strip connecting the open loops of the two hook loops.

3. In suspenders, two shoulder straps; each strap having a button hole at one end, a single series of step adjusting openings in the strap, therein a freely-swinging hook loop with an open loop; a hereon sliding single piece suspender end with button holes; a single piece adjusting strip connecting the open loops of the two hook loops.

4. In suspenders two shoulder straps; each having a button hole at one end, a single series of step adjusting button hole like slots in the strap, therein a freely swinging hook loop with an open loop; a hereon sliding single piece suspender end with button holes; an adjusting strip with step adjusting openings in the strip for connecting the open loops of the two hook loops.

CARL G. ARNOLD.